United States Patent [19]

Farley

[11] Patent Number: 4,798,313

[45] Date of Patent: Jan. 17, 1989

[54] ELASTOMERIC BLADDER FOR DISPENSING ICE CREAM

[76] Inventor: Brent L. Farley, 4215 Connecticut Ave., Baltimore, Md. 21229

[21] Appl. No.: 78,176

[22] Filed: Jul. 27, 1987

[51] Int. Cl.⁴ ............................................. B65D 35/28
[52] U.S. Cl. ..................... 222/192; 222/209; 222/215; 426/104; 426/115; 446/81; 446/204
[58] Field of Search ............... 222/39, 192, 206, 207, 222/210, 213, 209, 215, 386.5, 383; 137/2; 426/111, 112, 115, 130, 104, 393, 394, 515, 524; 446/473, 475, 204, 76, 81, 368; 604/132, 133, 73, 77; 84/170, 330, 384; 383/906; 116/137 R

[56] References Cited

U.S. PATENT DOCUMENTS

| | | | |
|---|---|---|---|
| 2,019,740 | 11/1935 | Starkey | 426/104 |
| 2,033,238 | 3/1936 | Geyer et al. | 426/104 |
| 2,143,661 | 1/1939 | Schrader | 222/207 |
| 2,248,963 | 7/1941 | Copeman | 426/104 |
| 2,490,368 | 12/1949 | Millstein | 446/76 |
| 2,617,324 | 11/1952 | Brody | 446/204 X |
| 3,124,275 | 3/1964 | Lake | 222/207 X |
| 3,306,503 | 2/1967 | Page | 222/386.5 |
| 3,552,604 | 1/1971 | Gordon | 222/215 |
| 3,604,595 | 9/1971 | Wiedeman | 222/99 |
| 3,848,808 | 11/1974 | Fetty et al. | 222/183 X |
| 4,121,375 | 10/1978 | Erickson et al. | 446/81 |
| 4,257,460 | 3/1981 | Paranay et al. | 446/473 X |
| 4,452,823 | 6/1984 | Connolly et al. | 426/115 |

Primary Examiner—Kevin P. Shaver
Attorney, Agent, or Firm—Walter G. Finch

[57] ABSTRACT

A tubular expandable elastic container for holding and dispensing a frozen confection as it thaws. The frozen confection holds the container in an expanded configuration, and as it thaws the contraction of the container forces thawed frozen confection from an open end of the container. A whistle is also provided at the open end of the container and a valve in the whistle structure for preventing air from entering the container when a user blows air into the whistle.

6 Claims, 2 Drawing Sheets

ELASTOMERIC BLADDER FOR DISPENSING ICE CREAM

FIELD OF THE INVENTION

This invention relates generally to containers that can progressively dispense flowable material.

BACKGROUND OF THE INVENTION

Coil-tube, lung power extendable toys are known. Flexible hoses have been used for dispensing, under pressure, flowable semi-solid materials such as concrete. Pressure-cans have been used to dispense whipped-cream or other flowable substances. It is conceivable that either could be used to dispense frozen confections.

SUMMARY OF THE INVENTION

However, neither these nor any other combination is known for yielding the same edible substance benefits as set out in the objects of this invention, that are:

to provide a system of frozen confection and disposable portable container making it progressively self-regulated in dispensing at a rate proportional to thaw-rate;

to provide a system as described that is usable for quick freezing and quick thawing of frozen confections;

to provide a system as described that has pumping capability in addition to the dispensing mode indicated.

Further, and in other ways than the above, a tubular plastic thimble and a frozen confection such as ice cream holding a resilient container in a stressed configuration, serve to dispense the frozen confection as it thaws from the resilient container, which resumes a relaxed, lower-volume configuration progressively during the thawing, forcing the frozen confection out an end of the resilient container for consumption. The resilient container is refillable. Additional pumping provisions in different embodiments are possible according to the invention.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
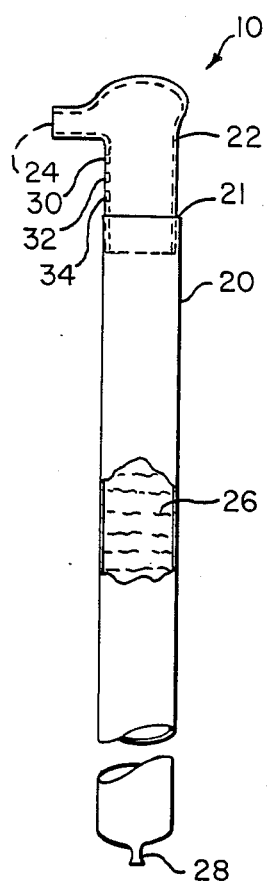
FIG. 1 is a side elevational view of a first preferred, embodiment of the invention.
Figure 2:
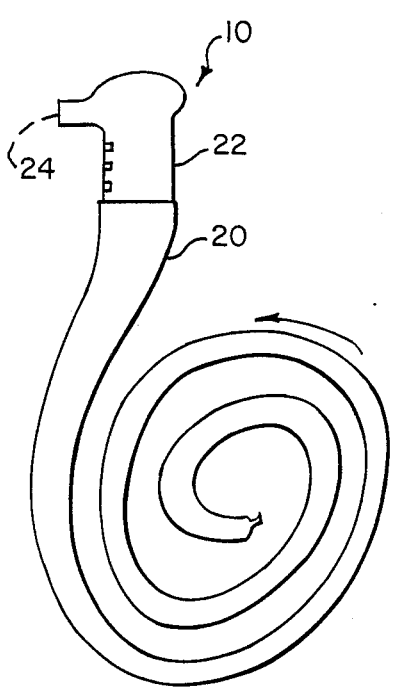
FIG. 2 is a side elevational view thereof in partially coiled position.

FIGS. 1 and 2 show embodiment 10. It includes flattened, elastically resilient tubular structure or resilient container 20 held on a semi-rigid elbow or hollow member 22 having in it first orifice or opening 24 for expression of ice cream 26 into the mouth of a user. The ice cream 26 or other frozen confection preferably fills the elbow 22 and the resilient container 20 down to the closed end 28. The tubular resilient container 20 securely fits the opening 21 of the resilient container 20 and holds the circular-section shape of the elbow 22; the fit is preferably detachable for filling the elbow 22 and resilient container 20.

To fill, material 26 to be used as frozen confection is poured or pumped (if flowable) or forced (if frozen) into the resilient container 20 and preferably also into the elbow 22. With the flexible plastic resilient container 20 in straight configuration, and the confection frozen solid inside, the system of elbow, tubular resilient container 20, and ice cream 26 may be stored at sub-freezing temperature until needed for sale and/or use at room temperature. Thawing of the ice cream 26 to an extent, as in FIG. 2 will permit the thimble resilient container 20 to curl and to flatten in section, diminishing the volume as the tube shape returns elastically to a predetermined non-straight form (spiral shown) in which it was molded. High-density polypropylene, or polyethylene, thermoplastic of about one tenth millimeter thickness may be most suitable for resilient container 20 ten to twenty centimeters in length and two centimeters in diameter, and can return by "memory". Preferably the cross-sectional resilient container 20 form selected will conventionally tend to flatten, with decrease in volume, as shown in the embodiment 10 of FIG. 1, and toward the bottom and in FIG. 2 as it curls.

As the frozen confection thaws, the container flexible portion proportionally expels the thawed content, extruding it at opening 24 through the mouth opening. Finger coverable orifices 30, 32, 34 can be provided in the neck of the elbow 22 so that the device, minus contents, can be played as a flute or whistle.

Figure 3:
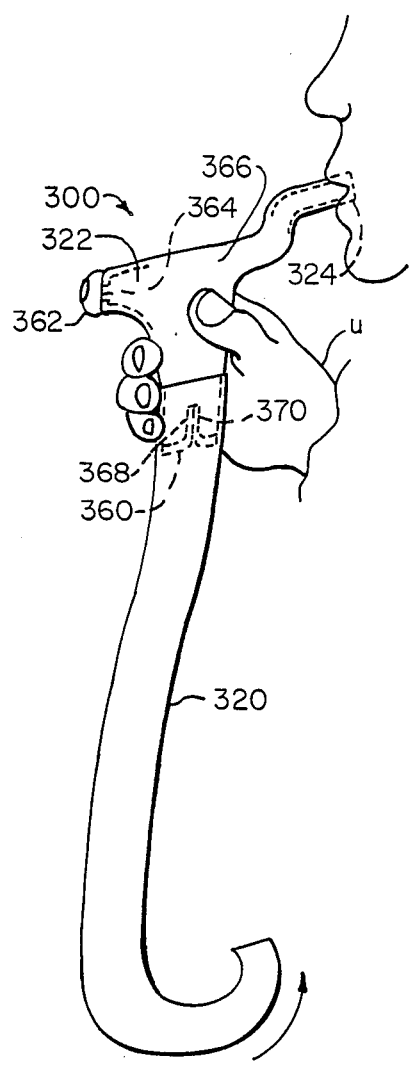
FIG. 3 is a side elevational view of a second embodiment held in use-position.

FIG. 3 shows an embodiment of the invention 300 a system similar in respects to that of the embodiment of the invention 10, but with a "T"-shaped hollow semi-rigid plastic top 322 instead of the elbow 22, and with a check valve 360 that prevents a user U from blowing back the confection when he (or she) closes off as with a finger 362 the first top orifice 364 and blows through the second top orifice 324 in preparation for expelling contents in the manner of a water gun. The resilient container 320 may be filled for the purpose with ice cream or water, as desired, and successive charges drawn into the "T"-chamber 366, ready for use as an edible or as a projectile. The check valve 360 may be conventional two contiguous outwardly-oriented flaps molded in the orifice through which ice cream 26 is drawn at the base of the "T"-shape and flexibly joined at the base, as at 368, 370.

Relaxation-deformation of the plastic resilient container 320 ("memory characteristics) to squeeze out ice-cream 26 may be in coil-form.

Figure 4:
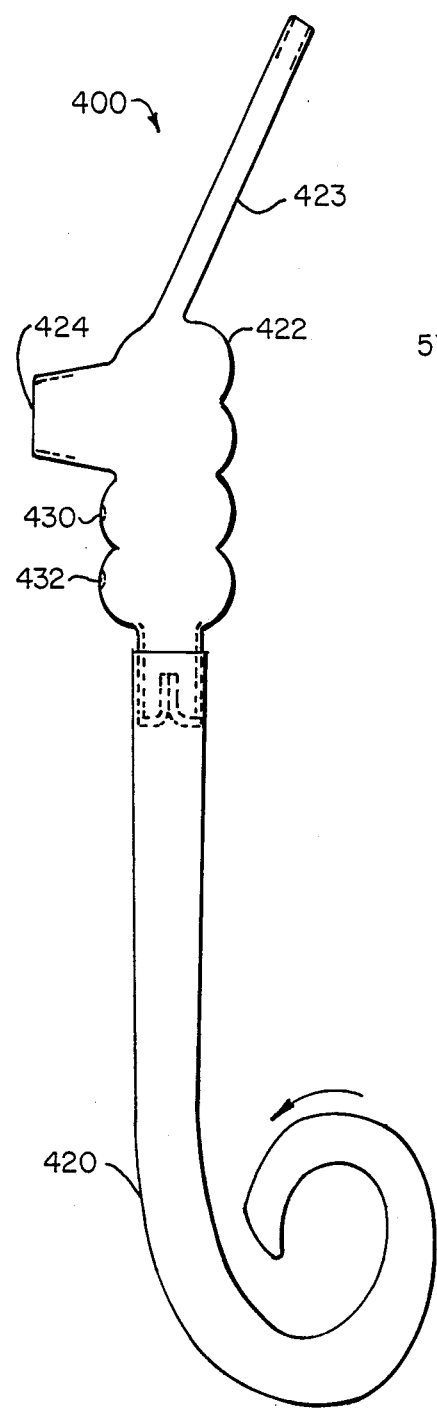
FIG. 4 is a side elevational view of a third embodiment.

FIG. 4 shows an embodiment of the invention 400 (third) that may be like the FIG. 3 system with finger-coverable flute holes 430, 432 in the top 422. Partial curling of the resilient container 420 (arrow) is shown, full curl being preferred before it stops. A first orifice 424 is provided. A whistle mouthpiece 423 is also provided.

Figure 5:
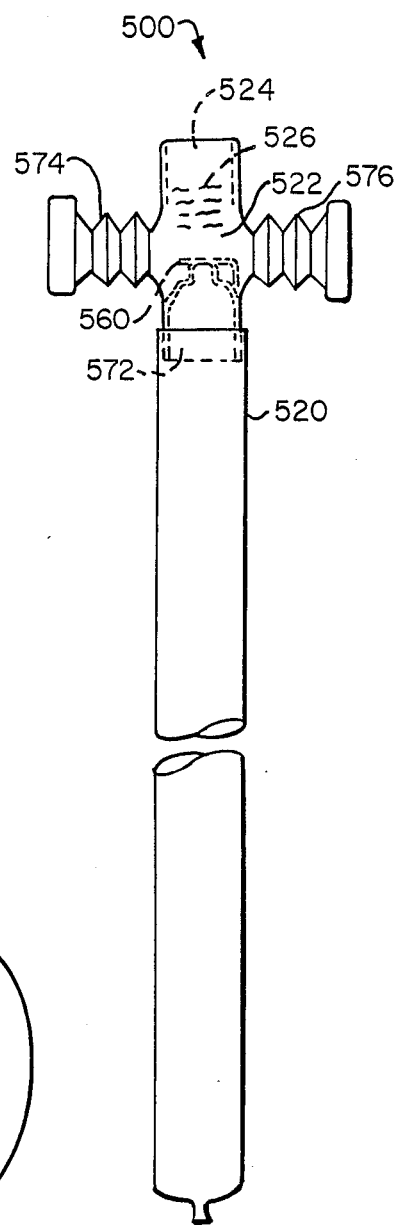
FIG. 5 is a side elevational view of a fourth embodiment.

In FIG. 5, a fourth embodiment of the invention, 500 shows "T"-shape top 522 and a resilient container 520 that may be as before described, with conventional flapper valve 560 in the intake 572 of the "T"-shape. One or more closed-end, opposed one-end closed, resiliently pumping bellows 574, 576 may be provided to force out flowable material 526 from the chamber 522 and being resilient, to draw in a fresh charge through orifice 572 for expulsion of thawing ice cream 26 when desired through orifice 524 by memory-return of the 520 resilient container alone or by operation of the pumps with the memory return of the resilient container 520 as described. The bellows may be squeezed together by one hand.

Figure 6:
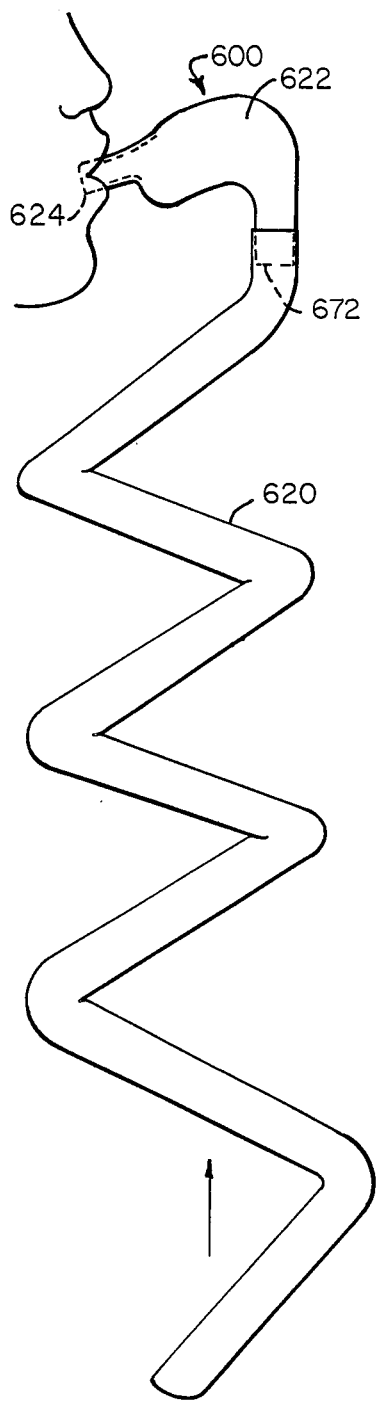
FIG. 6 is a side elevational view of a fifth embodiment.

FIG. 6 shows a fifth embodiment of the invention 600 with a hollow elbow 622 at the top to which is attached zig-zag thimble resilient container 620 at intake orifice 672 in a similar way to that previously described. Orifice 624 permits user intake of melted confection as the resilient container gradually assumes a close-fold accordion shape lengthwise (arrow) in which it was molded.

From this disclosure the refillable, versatile, multi-use but economical and simple fun-toy of this invention will be appreciated.

This invention is not to be construed as limited to the particular forms disclosed herein, since these are to be regarded as illustrative rather than restrictive. It is, therefore, to be understood that the invention may be practiced within the scope of the claims otherwise than as specifically described. For example, the container as viewed in elevational view may be of round, square or in the letters of the alphabet or otherwise fanciful shapes without departing from a progressive-collapse of the principle of the invention.

Further, the return could, but preferably not, include a metal spring bias instead of the plastic memory return, the latter being cheaper to make and so being disposable and biodegradable, and not so likely to injure the user as might a metal insert.

It will be appreciated that the resiliently collapsing thimble forms a handle below the mouthpiece convenient for holding in the hands. Warming by the hands can be used to speed the flow.

What is claimed and desired to be protected by United States Letters Patent is:

1. A progressive fluid dispensing system for continuously feeding thawing frozen confection, comprising: a resilient container having an open end and a closed end; said resilient container having a first, expanded configuration in which said frozen confection maintains the resilient container in the expanded configuration, and a second configuration in which the resilient container progressively contracts as the frozen confection thaws, whereby, thawing frozen confection flows from said open end of the container at a rate proportional to the rate of thawing of said frozen confection within said resilient container; a hollow member attached to and disposed within the open end of said resilient container and having means for whistling when a user blows air into an opening in said hollow member, and valve means at the inner end of said hollow member for preventing air from entering into said resilient container when a user blows into said hollow member.

2. A progressive fluid dispensing system as recited in claim 1, wherein said resilient container is formed of a resilient thermoplastic material, said hollow member is detachable from said open end of said resilient container, and an aperture in said hollow member for permitting the passage of said thawing frozen confection.

3. A progressive fluid dispensing system as recited in claim 1, wherein said resilient container has a flattened configuration in cross-section when it is empty.

4. A progressive fluid dispensing system as recited in claim 1, wherein said resilient container in said first configuration is a substantially straight configuration and said second configuration is a coiled configuration.

5. A progressive fluid dispensing system as recited in claim 1, wherein said resilient container in said second configuration is a zigzag configuration and said first configuration is a substantially straighter configuration than said zigzag configuration.

6. A progressive fluid dispensing system as recited in claim 1, wherein said means for whistling includes a series of openings in said hollow member.

* * * * *